2,381,010

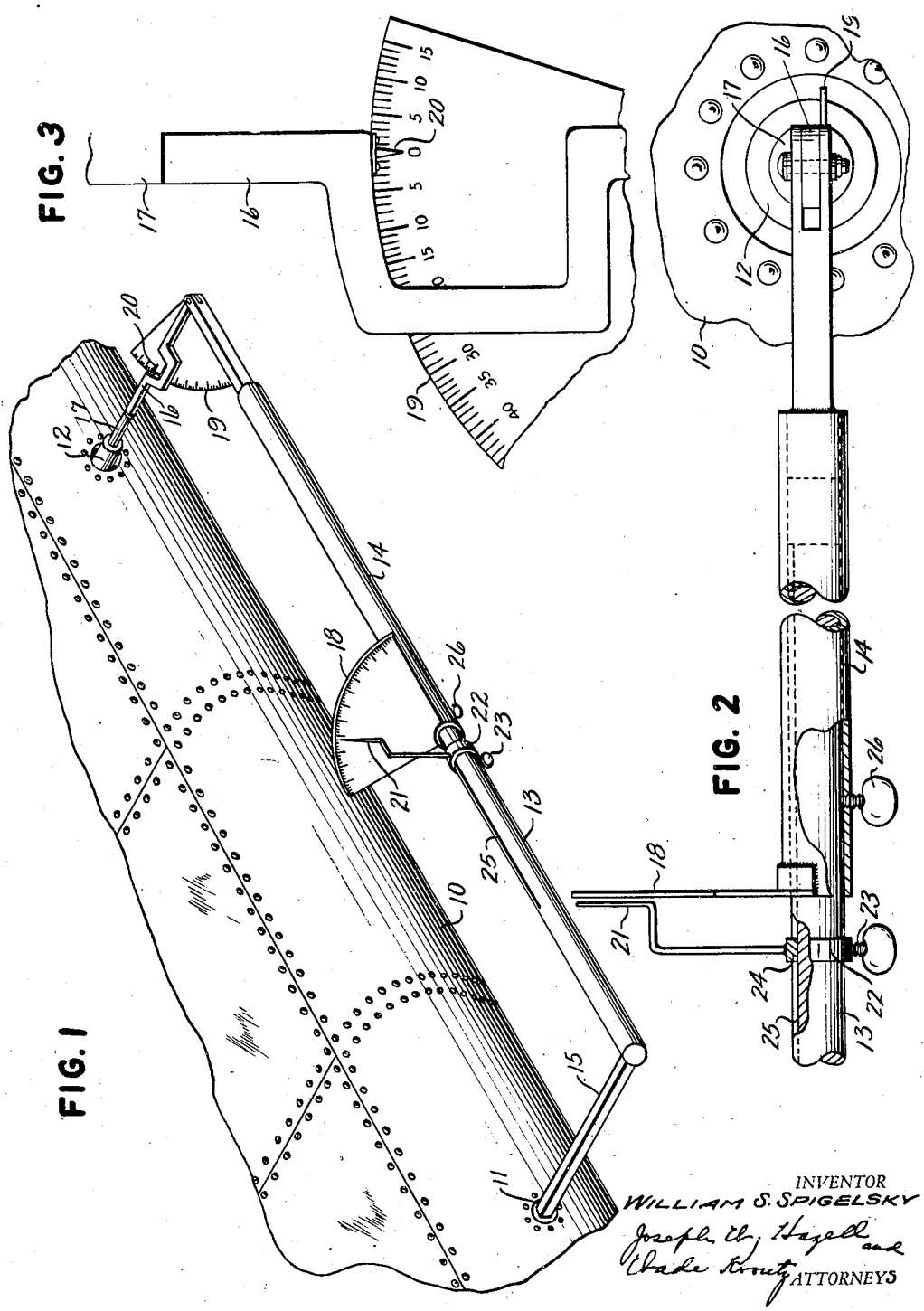
Aug. 7, 1945.   W. S. SPIGELSKY   2,381,010
GUN ALIGNING DEVICE
Filed Oct. 20, 1943
INVENTOR
WILLIAM S. SPIGELSKY
ATTORNEYS Patented Aug. 7, 1945

UNITED STATES PATENT OFFICE 2,381,010

GUN ALIGNING DEVICE

William S. Spigelsky, Monessen, Pa.

Application October 20, 1943, Serial No. 506,978

1 Claim. (Cl. 33—180)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a gun aligning device and more especially to means for aligning the bore of fixed type of aircraft guns with a predetermined line of the aircraft, such as the thrust axis or axis of the propeller shaft, in order that the guns may be trained on an object or target by a so-to-speak aiming of the craft.

A further object of the invention is to provide a device for readily determining the exact degree of pitch and lateral deflection of the bore of an aircraft gun with respect to a fixed predetermined but remote line of the craft in order to determine the degree of adjustment required to train the gun on a line parallel with an aircraft thrust line or convergingly across such line at a predetermined point in advance of the craft.

With the foregoing and other objects and aims in view, my invention resides in the combination of parts and in the details of construction hereinafter set forth in the following specification and appended claim, certain embodiments which have the characteristics of my invention and by which the same may be practiced, being illustrated in the accompanying drawing in which:

Fig. 1 is a perspective view of an embodiment of the invention illustrating an application thereof;

Fig. 2, a sectionalized front elevation of the device; and

Fig. 3, an enlarged plan view of the gun barrel-engaging trammel arm and its cooperating indicator and protractor.

In accordance with the objects of the invention, the device is primarily intended for alignment of guns mounted in aircraft wings, and for this purpose it is contemplated that the wing 10 be provided with a fixed socket 11, the axis of which is predetermined, such as being in parallel with the thrust axis of the plane, the crank shaft or axis of the propeller shaft. Therefore, for use in aligning the axis of the bore of a wing-mounted gun 12 with the axis of the wing-provided socket 11, I provide a trammel-like device including telescoping members 13 and 14 forming a trammel bar and from the extremities of which extend trammel rods 15 and 16. The trammel rod 15 is fixed to the trammel bar member 13 at a predetermined angle, 90° preferably, and is so shaped as to fit with precision into the socket 11 coaxially therewith. The trammel rod 16, however, is hinged to the trammel bar member 14, and comparable with trammel rod 15 is provided with at least an end portion 17 so shaped as to fit into the bore of a barrel of a gun 12 coaxially therewith.

In order to determine the vertical degree of angularity between the axes of the trammel rods 15 and 16, which instrumentally represent the axes of the fixed socket 11 and the bore of a gun 12, a protractor 18 is mounted vertically of or normal to the trammel bar portion 14 and transversely thereof, and in order to determine the horizontal, as distinguished from the vertical, degree of angularity between the axes of the trammel rods 15 and 16, a protractor 19 is also mounted on a trammel bar portion 14 in horizontal parallelism with the trammel rod 16. The protractor 19 is positioned in registrable relationship with the trammel rod 16 which is provided with an indicator 20 horizontally parallel with the axis of rod 16 and indicative of calibrations on that protractor. Similarly the trammel bar portion 13 is provided with an indicator 21 indicative of calibrations on protractor 18. Indicator 21 is releasably clamped to the bar portion 13, as by a band 22 and set screw 23, and though the indicator is adjustable to different positions along the bar, to bring the same into registrable association with the protractor 18 on bar portion 14, it is maintained in constant vertical angular relationship, preferably 90°, with trammel rod 15 by means of a lug 24 carried by band 22 and slidable in a slot or trough 25 in the trammel bar member 13.

The sleeve member of the telescoping trammel bar, i. e., trammel bar portion 14, is provided with a set screw 26 adapted to engage the bar portion 13 for fixing the axial as well as the rotative relationship between those bar portions when desired.

In using the device for gun alignment, set screws 23 and 26 are loosened; portion 17 of trammel rod 16 is inserted into the bore of the wing gun 12; the trammel bar swung around on the hinge connecting trammel rod 16 and bar member 14 and the telescoping members adjusted to a point where the bar rod 15 may be inserted into the socket 11. The axis of the gun bore may then be brought into vertical as well as horizontal parallelism with the axis of the socket 11 by adjusting the members to bring the indicator 21 in registery with a predetermined indicator 21 in registry with a predetermined calibration on protractor 18 indicating that the axis of the gun bore is brought into vertical parallelism with the axis of the socket. The gun is then adjusted horizontally until the indicator 20 registers at a point on protractor 19 indicating a 90° angular relationship between the trammel rod 16 and the trammel bar members 13 and 14 and bringing the axis of the gun bore into horizontal parallelism with the axis of the socket 11.

It will thus be seen that if the axis of the socket 11 is predeterminately fixed in parallelism with the thrust axis of the craft, the axis of the gun may readily be trained and fixed in vertical as well as in horizontal parallelism with the thrust of the craft by the utilization of the improved device, whereby the pilot, by aiming his craft at the target, may train the guns thereon.

Having described my invention and illustrated an embodiment by which the same may be practiced, what I claim is:

An aircraft gun aligning device comprising a trammel-like device having a trammel bar including coaxial members adjustable axially and rotatably, a trammel rod extending from one of said bar members in fixed constant angularity therewith and adapted to project the axis of a fixed socket, a second trammel rod hinged to the other of said bar members and adapted to project the axis of the bore of a gun, indicator means on one of said bar members and protractor means on the other of said bar members for determining the vertical angular relationship of said hinged rod with respect to said fixed rod, and indicator means on said hinged rod and protractor means on one of said bar members for determining the horizontal angular relationship between said hinged rod and said bar, whereby a gun mounted on an aircraft may be aligned with the axis of a socket fixed in said aircraft in proximity with said gun and with its axis in predetermined alignment with a predetermined line through said craft.

WILLIAM S. SPIGELSKY.